(12) United States Patent
Simon et al.

(10) Patent No.: US 9,640,166 B2
(45) Date of Patent: May 2, 2017

(54) SOUNDPROOF PANEL

(71) Applicants: ONERA (OFFICE NATIONAL D'ETUDES ET DE RECHERCHES AEROSPATIALES), Palaiseau (FR); ATECA, Montauban (FR)

(72) Inventors: Frank Simon, Toulouse (FR); Jean-Luc Brian, Montricoux (FR); Valia Fascio, Montauban (FR); Philippe Vie, Cugnaux (FR)

(73) Assignees: ONERA (OFFICE NATIONAL D'ETUDES ET DE RECHERCHES AEROSPATIALES), Palaiseau (FR); ATECA, Montauban (FR)

( * ) Notice: Subject to any disclaimer, the term of this patent is extended or adjusted under 35 U.S.C. 154(b) by 0 days.

(21) Appl. No.: 15/116,326

(22) PCT Filed: Jan. 28, 2015

(86) PCT No.: PCT/EP2015/051642
§ 371 (c)(1),
(2) Date: Aug. 3, 2016

(87) PCT Pub. No.: WO2015/117868
PCT Pub. Date: Aug. 13, 2015

(65) Prior Publication Data
US 2017/0011728 A1    Jan. 12, 2017

(30) Foreign Application Priority Data

Feb. 4, 2014  (FR) ..................... 14 00313

(51) Int. Cl.
*G10K 11/165* (2006.01)
*G10K 11/168* (2006.01)
(Continued)

(52) U.S. Cl.
CPC .............. *G10K 11/165* (2013.01); *B64C 1/40* (2013.01); *G10K 11/168* (2013.01); *G10K 11/172* (2013.01)

(58) Field of Classification Search
CPC ...... B64C 1/40; G10K 11/165; G10K 11/168; G10K 11/172
(Continued)

(56) References Cited

U.S. PATENT DOCUMENTS 4,667,768 A    5/1987   Wirt
6,085,865 A *  7/2000   Delverdier ................ B32B 3/12
                                                       181/286

(Continued)

FOREIGN PATENT DOCUMENTS

CA     2609510      12/2006
FR     2 815 603 A1  4/2002
(Continued)

OTHER PUBLICATIONS

International Search Report, dated Apr. 30, 2015, from corresponding PCT application.

*Primary Examiner* — Jeremy Luks
(74) *Attorney, Agent, or Firm* — Young & Thompson

(57) ABSTRACT

A soundproof panel has a sandwich structure, which includes two outer walls, a core, and modifying elements that are maintained in a fractal distribution by the core. The panel has an improved trade-off between sound attenuation efficiency and the weight of the panel.

12 Claims, 5 Drawing Sheets

(51) Int. Cl.
*B64C 1/40* (2006.01)
*G10K 11/172* (2006.01)

(58) Field of Classification Search
USPC .......................................... 181/292; 244/1 N
See application file for complete search history.

(56) References Cited

U.S. PATENT DOCUMENTS

| | | | |
|---|---|---|---|
| 6,851,515 B2 | 2/2005 | Dussac et al. | |
| 7,308,965 B2 | 12/2007 | Sapoval et al. | |
| 7,963,364 B2* | 6/2011 | Nadler .................. | G10K 11/16 181/293 |
| 2003/0098389 A1* | 5/2003 | Dussac ................... | F16F 7/01 244/17.27 |
| 2005/0109557 A1* | 5/2005 | Dravet ................ | G10K 11/172 181/292 |
| 2007/0292658 A1* | 12/2007 | Thomas .................. | B32B 3/10 428/116 |
| 2009/0166127 A1* | 7/2009 | Thomas .................. | B64C 1/40 181/292 |
| 2009/0250293 A1* | 10/2009 | Gleine ............... | B60R 13/0815 181/292 |
| 2010/0148001 A1 | 6/2010 | Hoetzeldt et al. | |

FOREIGN PATENT DOCUMENTS

| | | |
|---|---|---|
| FR | 2 943 000 A | 9/2010 |
| WO | 03/078740 A1 | 9/2003 |
| WO | 2006/128632 A1 | 12/2006 |
| WO | 2011/048484 A1 | 4/2011 |

* cited by examiner

SOUNDPROOF PANEL

The present invention relates to a soundproof panel that is transmission-efficient and has a sandwich structure.

Such panels already existed before the present invention and comprise:

two outer walls which are parallel to one other;

a core, which is rigidly connected to the outer walls so that shear stresses are transmitted between this core and each of the outer walls, and the core maintaining the outer walls apart from each other so as to delimit an intermediate space; and modifying elements which are contained in the intermediate space, and maintained by the core at locations which are fixed with respect to directions parallel to the outer walls.

An acoustic wave which is incident onto one of the outer walls of such a panel is transformed into a stationary bending vibration of the panel, this stationary vibration being a superposition of normal modes of the panel that are excited by the incident acoustic wave. Thus the transmitted acoustic wave, which emerges from the other outer wall, results from emission contributions which are generated by the excited normal modes.

Generally, prior to the present invention, the efficiency of acoustic transmission-attenuation in such a panel was obtained using modifying elements as ballast, or using modifying elements which are capable of absorbing the bending vibration energy of the panel, or are capable of modifying the stiffness of the panel. Optionally, several of these effects are combined by selecting the appropriate modifying elements.

For example, document FR 2 815 603 describes such a panel in which the core is constituted by a honeycomb structure, and the cells of this structure are filled with solid or hollow solid bodies. Acoustic damping is thus obtained by friction of the solid bodies against one another, or against the outer walls, or also against the honeycomb structure. But such soundproof panel is particularly heavy, since the intermediate space between its outer walls is filled with the solid bodies.

Document WO 2006/128632 describes another panel which has the sandwich structure described above, and in which recesses are arranged inside the core so that the panel behaves as a single-piece solid at low acoustic frequency, and behaves as if double-walled for the high acoustic frequencies. But such panel is more costly due to the creation of the core recesses while respecting dimensions suitable for these recesses.

Starting from this situation, one object of the present invention is to propose new soundproof panels which have a better trade-off between the efficiency of acoustic transmission-attenuation, the weight of the panels, their production cost, and their space requirement. In particular, when they are intended for use on board aeroplanes or aircraft, the additional mass constituted by each on-board panel is a highly significant constraint.

In order to achieve these or other objects, the present invention proposes a soundproof panel with two outer walls, a core and modifying elements as previously described, but in which the locations of the modifying elements, in projection onto a surface parallel to the outer walls, form a fractal distribution with a base pattern which is implemented by autosimilarity at least once. In other words, the corresponding fractal order value is greater than or equal to unity. Moreover, the fractal distribution is such that normal modes of bending vibration of the panel, called concentrated modes, have vibration antinodes with non-zero amplitude only inside a restricted zone of the panel, which is circumscribed by at least some of the modifying elements contributing to the fractal distribution. Therefore, the acoustic wave which is transmitted results only from transmission contributions which are generated inside the restricted zone of the panel when the excited normal modes are all concentrated modes.

Thus, for a panel according to the invention, the effective surface for producing the transmitted wave is restricted to a smaller portion of the panel, with the result that the radiant energy of the transmitted acoustic wave is consequently reduced.

Moreover, as the antinodes of the normal modes which are actually involved in the production of the transmitted wave are contained only inside the restricted zone, a destructive interference effect becomes more significant between the emission contributions of two neighbouring antinodes of one and same normal mode. This effect additionally contributes to reducing the radiant energy of the transmitted wave.

The incident and transmitted waves considered may have respective propagation directions which are or are not identical according to the directivity of the sought attenuation.

The efficiency of acoustic transmission-attenuation of a soundproof panel according to the invention is therefore not based on a mass increase effect, or a ballast effect, or on a bending vibration energy absorption effect of the panel, but on a particular distribution of the modifying elements of fractal type. This particular distribution controls the amplitudes of the bending vibration antinodes of the panel. In particular, the antinodes which are effective for producing the transmitted wave, i.e. those having vibration amplitude which is non-zero in the normal mode to which each belongs, are limited to the inside of the restricted zone. This zone is restricted by the fractal distribution of the modifying elements, because of being surrounded by a number of these elements. Those antinodes of each normal mode of bending vibration of the panel which are situated outside this restricted zone have zero vibration amplitudes, with the result that they do not contribute to the production of the transmitted wave.

In a soundproof panel according to the invention, the modifying elements may occupy only a small fraction of the intermediate space between the outer walls, and these elements may themselves have a limited individual mass. The total weight of the panel can thus be reduced.

Moreover, such soundproof panel can be produced at low cost, by using inexpensive components and simple methods for producing the panel.

Optionally, the restriction of the panel surface area that is effective for producing the transmitted wave, and the effect of destructive interference for the transmitted acoustic wave, for a panel according to the invention, may be combined with additional damping effects by absorption of a part of the bending vibration energy of the panel. However, the efficiency by damping will generally be much lower than the efficiency of the effects of the fractal distribution. Similarly, a possible ballast effect by the modifying elements will also be much smaller than the effects of the fractal distribution.

In various embodiments of the invention, the following improvements may be adopted, in particular in order to achieve the objects of the invention to a greater extent:

the base pattern for the fractal distribution of the modifying elements may be implemented by autosimilarity at least twice, preferably at least three times, corresponding to a fractal order value that is greater than or equal to two, preferably three;

this base pattern may be a Vicsek pattern or a Sierpinski pattern;

the modifying elements may comprise spheres, preferably hollow spheres, spring elements, or portions of viscoelastic material;

the core may have a cellular structure, and in this case the modifying elements can be contained in a restricted selection of the cells of the structure, this selection of cells forming the fractal distribution of the modifying elements;

the core may have a honeycomb structure; and the panel may be curved in at least one direction which is parallel to this panel.

Such soundproof panel may be adapted to form all or part of an interior lining of a cockpit or cabin. In particular, it may be adapted in order to be arranged inside an aeroplane cabin or a cockpit of a rotorcraft.

Other features and advantages of the present invention will become apparent from the following description of non-limitative embodiments, with reference to the attached drawings in which:

FIG. 4b represents a normal mode of bending vibration for the panel in FIG. 4a;

Figure 1:
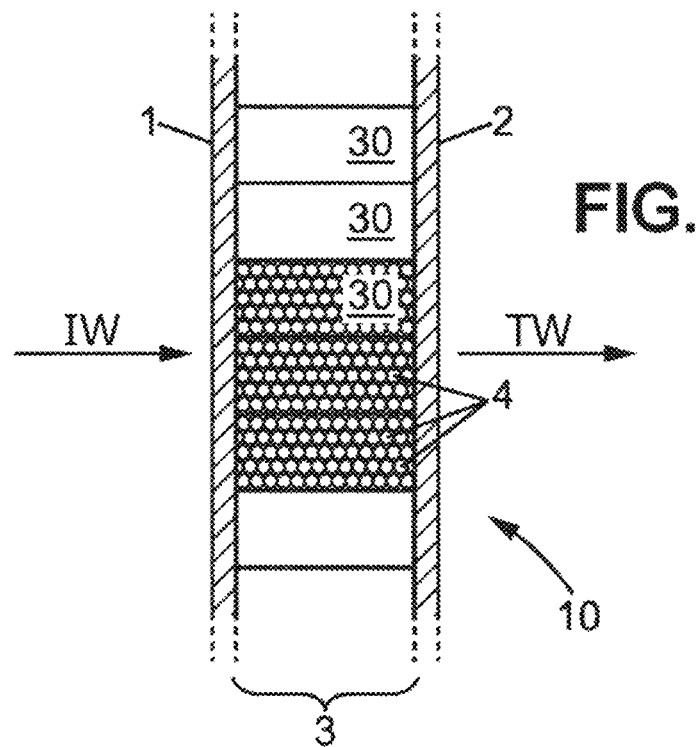
FIG. 1 is a cross-sectional view of a soundproof panel according to the invention.

For reasons of clarity, the dimensions of certain elements represented in FIG. 1 do not correspond either to actual dimensions or to the relationships between actual dimensions. Moreover, identical references indicated in different figures denote identical elements or those having identical functions.

According to FIG. 1, the soundproof panel 10 comprises the two outer walls 1 and 2, and the core 3 which is situated between them. Each wall 1, 2 can be individually of a type and composition known prior to the present invention, in particular such as those commercially available. Preferably the walls 1 and 2 are based on at least one composite material. Their peripheral shape may be any whatever: square, rectangular, trapezoidal, triangular, round, etc., depending on the use of the panel 10. Optionally, the walls 1 and 2 may include openings, and/or be preformed with an overall curvature. The core 3 may be constituted by a honeycomb structure, for example of aluminium or aluminium alloy, or also of aramid paper impregnated with a phenolic resin, such as the product which is commercially known as Nomex® The axis of the honeycomb structure may be perpendicular to the walls 1 and 2. Moreover, the core 3 may be bonded to the two walls 1 and 2, on the surfaces thereof which are turned towards the inside of the panel 10. The cells of the honeycomb structure, which are referenced 30 in FIG. 1, may have dimensions comprised between 0.4 cm and 3 cm (centimeter) parallel to the walls 1 and 2, and the core 3 may have a thickness comprised between 0.5 cm and 4 cm perpendicular to the walls 1 and 2.

FIG. 1 also shows an incident acoustic wave IW which reaches the outer wall 1 from the left side, and an acoustic wave TW which is transmitted by the panel 10 from the incident wave IW, to the right of the panel 10. The two acoustic waves IW and TW may have respective directions of propagation that are identical.

In order for such a sandwich panel 10 to have an effective bending vibration, in particular at frequencies which correspond to the field of acoustic frequencies, it is necessary for shear stresses to be transmitted between the outer wall 1 and the core 3, and also between the core 3 and the outer wall 2. By shear stress is meant stresses which tend to move each wall 1, 2 relative to the core 3, parallel to the walls 1 and 2 themselves. To this end, the assembly between each wall 1, 2 and the core 3 must be sufficiently rigid, and assembly methods known to a person skilled in the art are suitable, such as bonding methods.

Modifying elements 4 are contained in a selection of the cells 30, and the manner of selecting those of the cells 30 that thus contain the elements 4 is one of the features of the invention. The modifying elements 4 may be of different types, such as solid spheres, hollow spheres, hard spheres, flexible spheres, spring elements, or blocks of viscoelastic material also called "silent-blocks". However, those of these modifying elements 4 which lead to an improved compromise between weight reduction and acoustic damping for the panel 10 are preferred. In particular, panels according to the invention which are acoustically efficient and which have a reduced overall weight were produced using hollow spheres.

In a soundproof panel 10 according to the invention, the modifying elements 4 act by producing a local alteration in the bending vibration ability of the panel. To this end, they locally modify certain parameters of the panel 10 which act on the bending vibrations thereof. In particular, the modifying elements 4 may locally change the apparent density values of the panel 10, its rate of absorption of vibrational energy, etc. between the zones where the modifying elements are present and zones where they are absent. More precisely, a bending wave which propagates in the surface of the panel 10 is partially reflected at the boundary between two adjacent zones, one of which contains modifying elements 4, but not the other. The stationary wave structure which results from such reflections in addition to the reflections at the peripheral boundaries of the panel 10, may be adapted with respect to the amplitudes of vibration of the bending vibration antinodes, when the distribution of the modifying elements 4 is of fractal type. Indeed, such fractal distribution is capable of determining these antinodes of the bending vibration of the panel, in particular via the size of the base pattern that is used in order to generate the fractal distribution, the geometry of the pattern itself, the number of autosimilar repetitions of the pattern, the fractal order value and its overall position with respect to the panel.

Figure 2A:
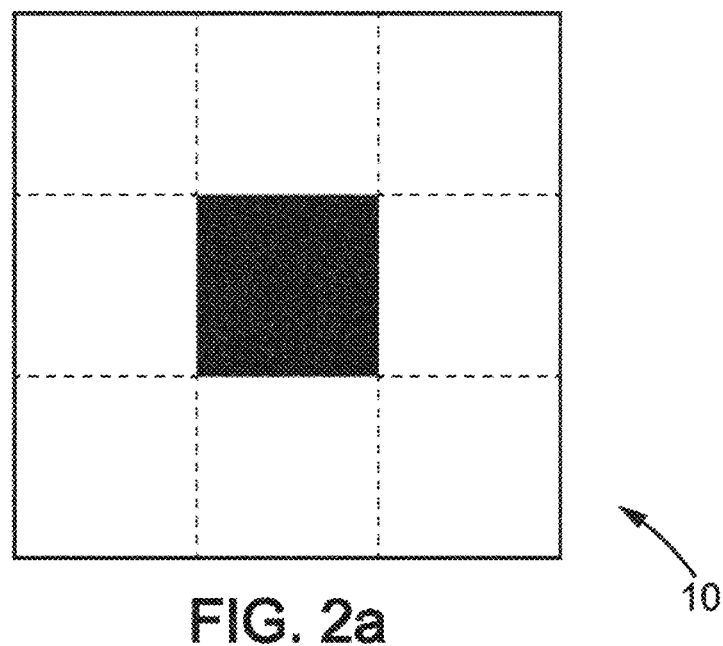
FIGS. 2a and 2b are plan views of soundproof panels according to the invention, and for which a Sierpinski base pattern has been implemented with a fractal order value which is equal to unity for FIG. 2a and equal to three for FIG. 2b.

In the embodiment in FIG. 2a, the soundproof panel 10 has a peripheral boundary of square shape, and a so-called "Sierpinski" fractal distribution pattern has been used once. This pattern is constructed in the following manner: each side of the square is divided into three equal segments, so that the surface area of the panel 10 is divided into nine squares with the same surface area. The core 3 of the panel 10, which is constituted by a honeycomb in the example under consideration, is then filled with modifying elements 4 in the central square, shaded black in FIG. 2a, without putting modifying elements in the eight peripheral squares. The fractal order of the distribution of the modifying elements is thus equal to unity, and the surface area filling ratio of the panel with modifying elements is 1/9=0.111.

Figure 2B:
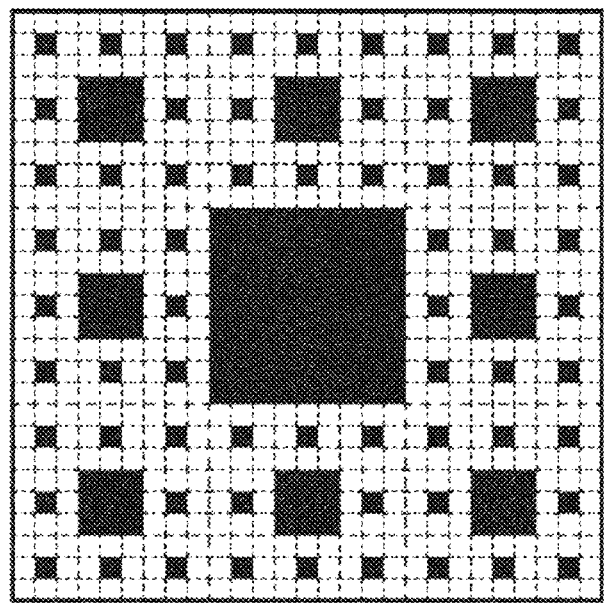

This Sierpinski base pattern can therefore be implemented again inside each of the eight peripheral squares which have just been mentioned with reference to the panel 10 in FIG. 2a, then one more additional time according to the same principle, known as autosimilarity. This principle of fractal construction is well known, so that it is not necessary to detail it further. The soundproof panel 10 in FIG. 2b is obtained in this manner, in which the squares shaded black all correspond to the zones of the panel 10 in which the core 3 is filled with modifying elements 4. The core 3 has no modifying elements outside these shaded black squares. The fractal order of the distribution of the modifying elements is now equal to three, and the surface area filling ratio of the panel with modifying elements is 0.298.

Figure 3:
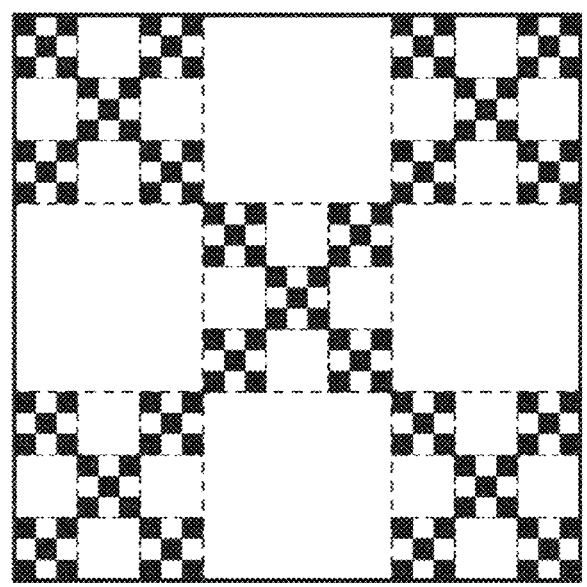
FIG. 3 is a plan view of another soundproof panel according to the invention, and for which a Vicsek base pattern has been implemented with a fractal order value equal to three.

FIG. 3 corresponds to FIG. 2b, but for a so-called "Vicsek" base pattern. The fractal order of the distribution of the modifying elements 4 is again equal to three, but the surface area filling ratio of the panel 10 with modifying elements is 0.171 using this base pattern. This Vicsek pattern may be preferred to the Sierpinski pattern in FIG. 2b, because it produces a smaller panel weight increase for the equivalent fractal order and for the same modifying elements used.

The desired distribution according to the invention for the modifying elements 4 in the core 3 of the panel 10 may be produced using the stencil principle. The core 3 is fixed to the outer wall 1, for example by bonding, and the panel 10 in this partial state of assembly is arranged horizontally, with the core 3 upwardly exposed. A mask equipped with openings is then placed over the panel 10, on the core 3, and modifying elements 4 are spread in excess over the mask in this embodiment. The modifying elements 4 then fill the cells 30 of the honeycomb structure which constitutes the core 3, through the openings in the mask. The excess of modifying elements is then removed, for example by scraping the upper surface of the mask. In practice, when the core 3 has a cellular structure with a fixed size of the cells 30, the maximum fractal order value which can be produced is limited by this cell size. This limitation is due to the reduction in size of the base pattern each time it is repeated in order to produce an additional unit for the fractal order, and such repetition is only possible if the base pattern is still sufficiently larger than the cells.

More precisely, a soundproof panel has normal modes of bending vibration which are each characterized by a number of vibration antinodes, and by the positions of these vibration antinodes in the surface of the panel. The incident acoustic wave IW which reaches the panel 10 excites several normal vibration modes of this latter, with amplitudes and phase shifts of these normal modes which are determined by the positions of the vibration antinodes for these normal modes in relation to one another.

Figure 4A:
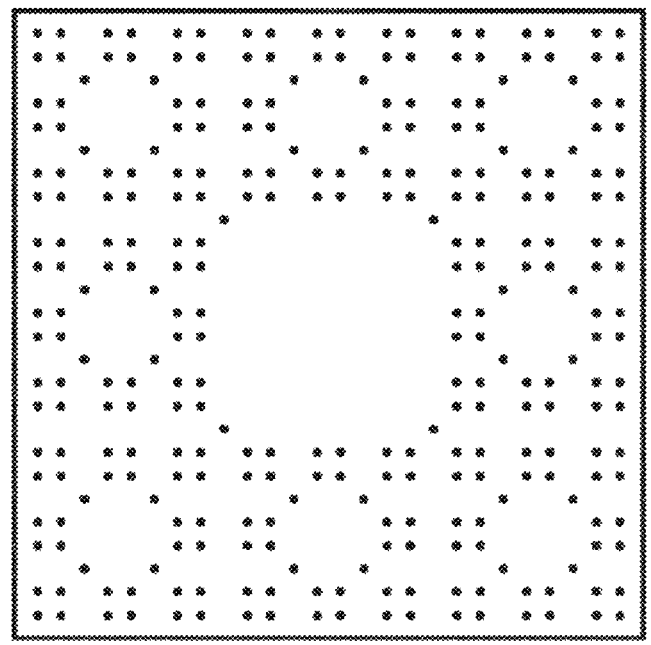
FIG. 4a is a plan view of yet another soundproof panel according to the invention.
Figure 4B:
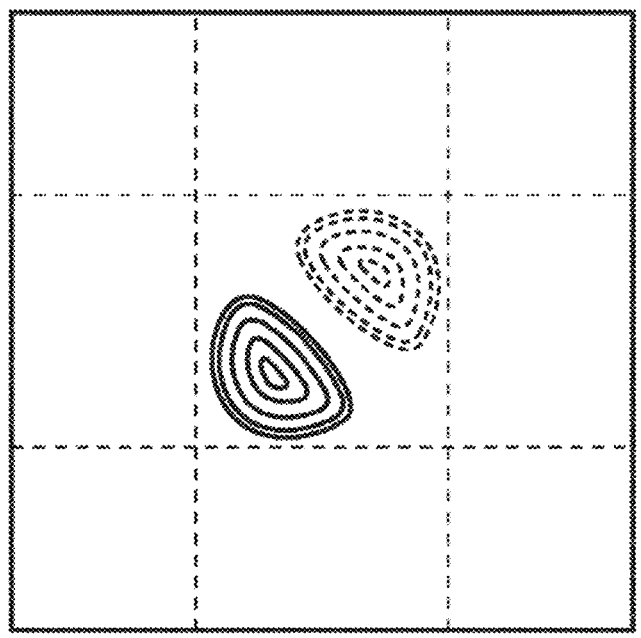

According to the invention, the modifying elements 4 are arranged in the core 3 according to a fractal distribution selected in order to assign a vibration amplitude which is zero to certain normal mode antinodes. In other words, certain vibration antinodes are suppressed, for at least one normal mode of the panel. These vibration antinodes that are suppressed are situated outside a restricted zone inside the panel. This zone, where the vibration antinodes for the normal mode are retained, is surrounded by modifying elements which belong to the fractal distribution. FIG. 4a is similar to FIG. 2b for another Sierpinski fractal pattern, and FIG. 4b shows a deformation of the panel of FIG. 4a according to a particular normal mode of bending vibration. The fractal order is again equal to 3. When the invention is not implemented, for example when the modifying elements are uniformly distributed over the entire surface of the panel, each normal mode has bending vibration antinodes which together cover the entire surface of the panel. FIG. 4b shows that the normal mode represented only has two antinodes that are located inside the central square, when the panel is divided into three columns and three rows of equal size. The solid level lines and the broken level lines shown in FIG. 4b indicate that the two antinodes vibrate in antiphase. The suppression of the antinodes in the eight peripheral squares is obtained through the fractal distribution of the modifying elements, according to FIG. 4a.

Each normal mode of bending vibration of the panel 10 has an acoustic emission feature. The acoustic wave TW transmitted by the panel 10 results from contributions which are produced by all of the normal modes excited by the incident wave IW. These contributions are combined according to the principle of acoustic interferences, which depend on the zones of the panel from which the contributions of each normal mode originate. Now, these zones are the positions of the vibration antinodes of each normal mode. Thus, by allowing certain vibration antinodes to be suppressed for the normal modes of the panel 10, the fractal distribution of the modifying elements 4 makes it possible to control the energy of the acoustic wave TW that is transmitted by the panel 10, from the incident acoustic wave IW. All the normal modes of bending vibration can be determined theoretically or by digital simulation using a computer, with the positions and the amplitudes of their vibration antinodes. Similarly, the wave TW that is transmitted can be mathematically reconstructed by combining the contributions of the normal modes that have been excited by the incident wave IW, again by digital simulation.

Figure 5:
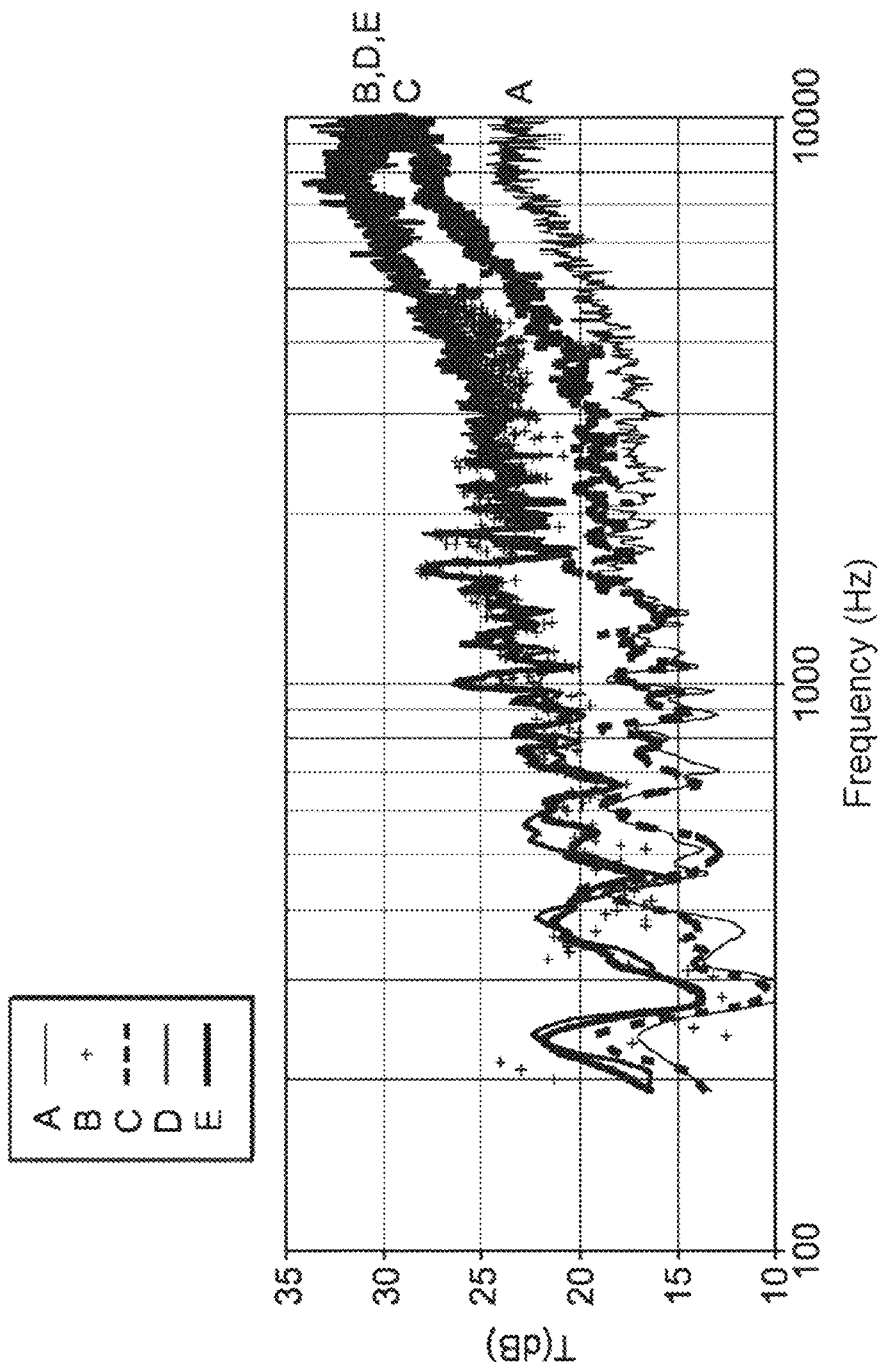
FIG. 5 is a acoustic attenuation diagram for three soundproof panels according to the invention and for two soundproof panels as they existed prior to the invention.

The diagram in FIG. 5 shows the energy attenuation of the transmitted wave TW, with respect to the incident wave IW for five soundproof panels, as this attenuation was measured experimentally. This attenuation is denoted T and expressed in decibels (dB) along the vertical axis. The horizontal axis indicates the frequency of the incident wave IW, expressed in hertz (Hz). The five panels used for this diagram have outer walls of a composite material and a honeycomb core, which are similar from one panel to another. Their common peripheral dimensions are 0.9 m (meter)×0.9 m. These panels differ in the following manner, as indicated by their caption references:

A: first reference panel, the core of which has no modifying elements throughout the entire surface of the panel
B: second reference panel, the core of which is filled with modifying elements formed of rigid spheres, throughout the entire surface of the panel
C: first panel according to the invention, the core of which is filled with modifying elements formed of rigid spheres, according to the fractal distribution in FIG. 3
D: second panel according to the invention, the core of which is filled with the same modifying elements as in panel C, but according to the fractal distribution in FIG. 2a
E: third panel according to the invention, the core of which is filled with modifying elements formed of flexible spheres, but again according to the fractal distribution in FIG. 2a The spheres of the modifying elements that are used may be of polymer when they are rigid or elastomer when they are flexible.

The acoustic attenuation of the panel B is greater than that of the panel A, due to the ballast effect provided by the rigid spheres.

The acoustic attenuation of the panel C is between that of the panels A and B above 2000 Hz, and comparable to that of the panel A below this frequency value.

The panels D and E have acoustic attenuations that are comparable to one another between 200 Hz and 10,000 Hz and also comparable to that of panel B.

The acoustic attenuation of the panel C is less than those of the panels B, D and E, in part because its proportion of ballast is lower.

Due to the effect of the fractal distribution of the modifying elements in the panels D and E, the acoustic attenuations that they provide are approximately as good as that of the panel B even though their proportions of ballast are considerably lower.

Figure 6:
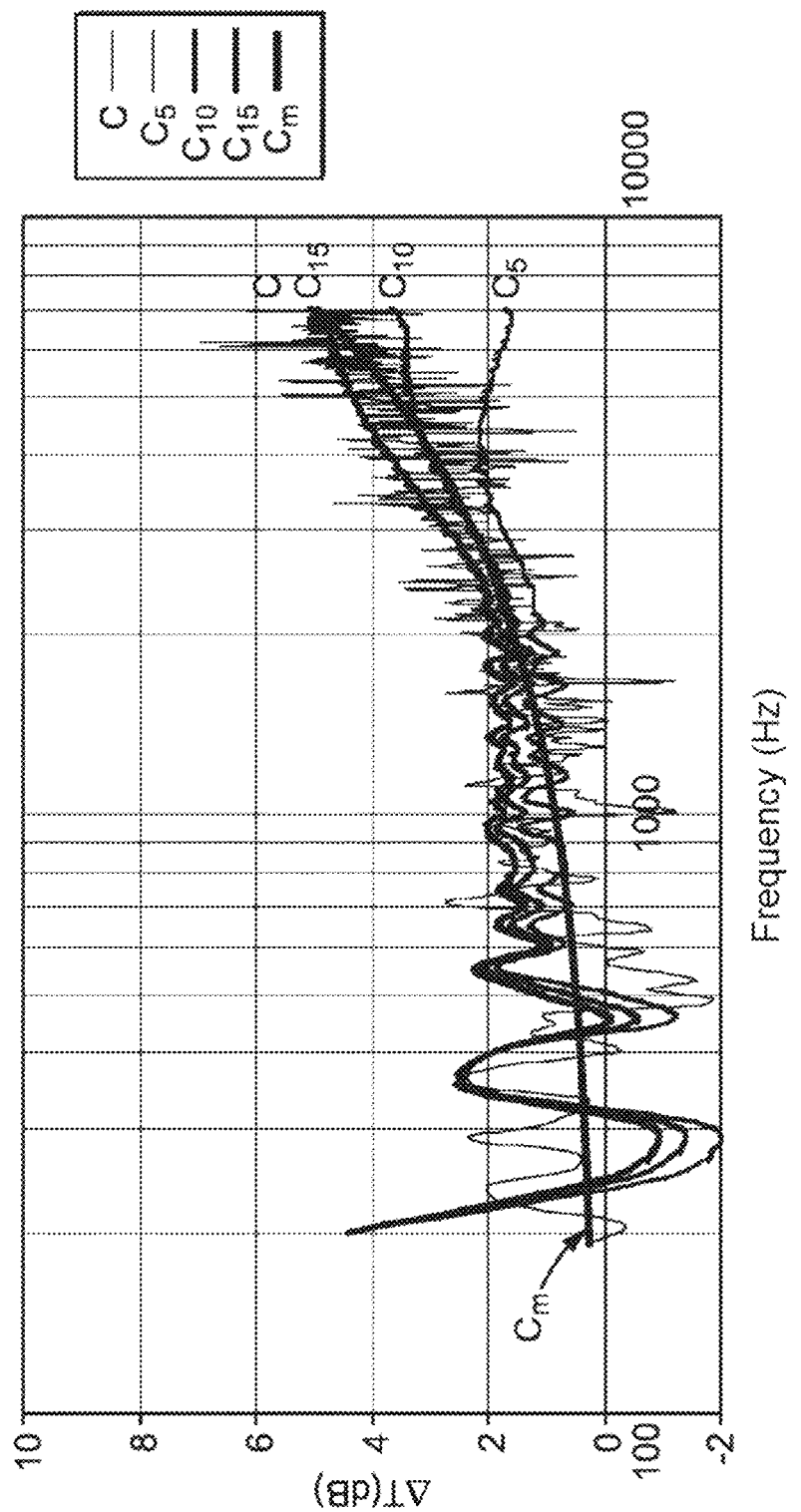
FIG. 6 is a diagram showing the improvement in acoustic attenuation of four soundproof panels according to the invention, with respect to one of the two soundproof panels existing prior to the invention and used for FIG. 4.

Finally, the diagram in FIG. 6 shows the energy attenuation differences ΔT calculated by digital simulation for the panel C and for three additional panels, with respect to the panel A described above. The same acoustic frequency interval is considered: between 200 Hz and 10,000 Hz. The three additional panels, referenced $C_5$, $C_{10}$ and $C_{15}$, are identical to the panel C as regards the fractal distribution of the modifying elements and as regards the ballast capacity thereof. But a damping capacity of the bending vibrations of the panel is added, and varied as follows C: zero damping capacity for the rigid spheres $C_5$, $C_{10}$ and $C_{15}$: damping by the modifying elements corresponding to a loss factor of 5%, 10% and 15% respectively The smooth curve, marked $C_m$, is a mean curve for the panel C. Comparison of the attenuation values for the four panels C, $C_5$, $C_{10}$ and $C_{15}$ shows that the damping capacity of the modifying elements has no significant effect with respect to the fractal distribution of these elements.

It is understood that the present invention can be reproduced by modifying certain aspects with respect to the embodiments which have been described in detail, while retaining at least part of the advantages mentioned. Among the possible modifications, the following are mentioned:

base patterns for the fractal distribution of the modifying elements other than the Sierpinski and Vicsek patterns can be used;

the fractal order of the distribution of the modifying elements can be any whatever, equal to one, preferably equal to two, even more preferably equal to three, etc.;

the core can have a configuration other than that of a honeycomb structure;

the panel can have any overall curve, a peripheral boundary of any shape whatever, and comprise openings in its surface;

the two outer walls can have variable compositions which are or are not identical from one wall to the other; and the method of assembling each wall and the core can be any whatever, provided that it allows shear stresses to be transmitted between these three components.

Finally, it is also understood that the invention can be combined with any methods whatever for fixing the soundproof panel to a load-bearing structure. In particular, the panel can be attached by local supports, or brackets at intervals, or can be fitted into a supporting frame at its peripheral edge. The normal modes of bending vibration of the panel can thus be partially determined by the fixing mode thereof, and the invention applies to the normal modes which are determined in this manner. Generally, the acoustic wave that is transmitted by the panel, as considered in the present invention, does not take account of an additional acoustic transmission which may be produced directly by the panel fixing elements.

The invention claimed is:

1. Soundproof panel (10) that is transmission-efficient and has a sandwich structure, comprising:
   two outer walls (1, 2) parallel to one another;
   a core (3) rigidly connected to the outer walls so that shear stresses are transmitted between said core and each of the outer walls, and the core maintaining the outer walls apart from each other so as to delimit an intermediate space; and
   modifying elements (4) contained in the intermediate space, and maintained by the core at locations which are fixed with respect to directions parallel to the outer walls;
   wherein an acoustic wave (IW) which is incident onto one on the outer walls (1) is transformed into a stationary bending vibration of the panel (10), said stationary vibration being a superposition of normal modes of the panel that are excited by the incident acoustic wave, and a transmitted acoustic wave (TW) which emerges from the other outer wall (2) results from emission contributions generated by the excited normal modes,
   wherein the locations of the modifying elements (4) in projection onto a surface parallel to the outer walls (1, 2) form a fractal distribution with a base pattern which is implemented by autosimilarity at least once, said fractal distribution being such that normal modes of bending vibration of the panel, called concentrated modes, have vibration antinodes with non-zero amplitude only inside a restricted zone of the panel which is surrounded by at least some of the modifying elements contributing to the fractal distribution, so that the transmitted acoustic wave (TW) results only from emission contributions which are generated inside said restricted zone of the panel when the excited normal modes are all concentrated modes.

2. Panel according to claim 1, wherein the base pattern is implemented by autosimilarity at least three times in order to form the fractal distribution of the modifying elements (4).

3. Panel according to claim 1, wherein the base pattern is a Vicsek pattern or a Sierpinski pattern.

4. Panel according to claim 1, wherein the modifying elements (4) comprise spheres, preferably hollow spheres, spring elements or portions of viscoelastic material.

5. Panel according to claim 1, wherein the core (3) has a cellular structure, and the modifying elements (4) are contained within a selection of cells (30) of said structure, said selection of cells forming the fractal distribution of the modifying elements.

6. Panel according to claim 5, wherein the core (3) has a honeycomb structure.

7. Panel according to claim 1, wherein said panel is curved in at least one direction parallel to said panel.

8. Panel according to claim 1, wherein the panel is configured to form at least part of an interior lining of a cockpit or cabin.

9. Panel according to claim 8, wherein the panel is configured to be arranged inside a cabin of an aeroplane or a cockpit of a rotorcraft.

10. Panel according to claim 2, wherein the base pattern is a Vicsek pattern or a Sierpinski pattern.

11. Panel according to claim 2, wherein the core (3) has a cellular structure, and the modifying elements (4) are contained within a selection of cells (30) of said structure, said selection of cells forming the fractal distribution of the modifying elements.

12. Panel according to claim 11, wherein the core (3) has a honeycomb structure.

* * * * *